2,730,700
ERROR AVOIDANCE SYSTEM FOR INFORMATION HANDLING MACHINES

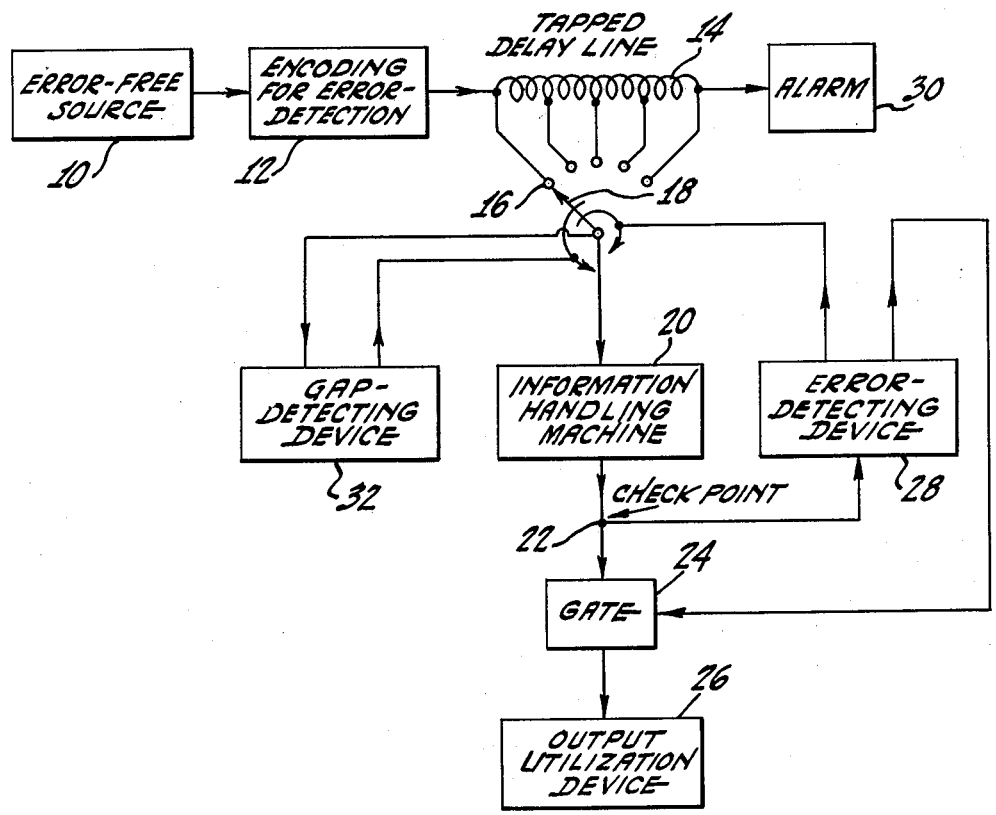

Robert Serrell, Princeton, N. J., assignor to Radio Corporation of America, a corporation of Delaware Application November 24, 1950, Serial No. 197,285

6 Claims. (Cl. 340—213)

This invention relates to error avoidance in information-handling machines.

The successful application of high speed electronic computing techniques to information-handling work requires that the frequency of error be rigidly controlled. Many information-handling problems, such as, for instance, bank bookkeeping, cannot be considered as satisfactorily solved unless the error frequency is almost vanishingly small—something of the order of one wrong digit in billions. This is a high order of accuracy, not yet consistently approached by any of the digital computers recently built for scientific work. Therefore, effective techniques of error avoidance must be developed before electronic information-handling machines can become as useful as they promise to be.

One type of error which occurs in an information-handling machine is the kind which is due to a malfunctioning or failure of the machine. To determine the occurrence of such malfunction or failure, various monitoring systems have been devised as well as codes which are applied to an information-handling machine for the purpose of detecting any deviation or alteration of the information by the machine. However, the apparatus required for the automatic correction of errors is not fail safe. It is evident that means of error avoidance that are based on the automatic correction of any errors detected, without repetition of the intervening operations, cannot be assumed to be entirely free from possibility of malfunctioning, for an error in the correcting mechanism itself cannot be detected.

It is to be noted, however, that if any temporary malfunctioning of any part of an information-handling machine causes an error, a repetition of the operations involved (starting at a point at which the information is known to be correct) should eliminate the error. If repetition of this sort does not eliminate an error, then it is evident that the error is not due to a temporary cause and that the apparatus involved should either be replaced or repaired. A limited repetition of operations, therefore, appears to be a desirable feature in order to save the work that has already been done by the machine up until the point where the erroneous operation due to the temporary malfunction occurs. Also shut-down of the machine for repair is avoided where the malfunction clears itself, as evidenced by the proper processing by the machine of the repeated information.

It is therefore an object of the present invention to provide a novel error detection and avoidance system for electronic information-handling machines.

It is another object of the present invention to provide a simple error detection and avoidance system for electronic information-handling machines.

It is still another object of the present invention to provide a novel error detection and avoidance system for electronic information-handling machines which utilizes reapplication of information and repetition of operations between a known error-free point and the point of error.

These and further objects of the present invention are achieved by securing an error-free source of information for an information-handling machine, encoding this information for error detection purposes, applying the information an item at a time to the information handling machine to be processed, storing the item of applied information until the output of the information-handling machine is inspected for errors. If no errors are found, a subsequent item of information is provided for the machine and stored as was the previous item. If an error is detected by an error detecting device at the check point, then a gate is closed to prevent the external transfer of erroneous information and the item of information is supplied to the information-handling machine input from the storage means and is also stored again. As long as an error is detected the stored information is repeatedly applied to the information-handling machine and the output of the machine is blocked from supplying the erroneous information externally. If the machine eventually processes the item of information properly then a new item of information is supplied. If, after a predetermined number of repetitions, the machine still functions improperly, then an alarm is excited, indicating that the malfunctioning is not temporary.

The novel features of the invention as well as the invention itself, both as to its organization and method of operation, will best be understood from the following description when read in connection with the accompanying drawing showing a schematic diagram of an embodiment of the invention.

Referring now to the drawing, there is shown an error-free source of information 10, the output from which is applied to an encoder 12 which encodes this information for purposes of error detection only. By an error-free source of information 10 is meant a source of information whose accuracy is not questioned. This information may be the input data to an information-handling machine or the data obtained as a result of other operations of the machine which have been checked.

In connection with the device for encoding for error detection, it should be pointed out that error detecting codes have long been known which permit unambiguous detection of a single error. Perhaps the simplest of these is the "odd-even" check. In a set of $n$ binary digits, the first $(n-1)$ places are used for the information conveyed. At the source, the $n$th digit is determined to be either "0" or "1" in such a way that $n$ places have an even number of 1's. This allows for detection of any single error, for it is evident that a single error would leave an odd number of 1's in the set of $n$ digits. More recently codes have been developed which permit detection of several errors as well as the correction of one or more of the errors detected. The underlying theory involves the use of a function space possessing as many dimensions as there are binary places in the words handled. Each word can be represented as a point in this space. A metric is established by means of which the "distances" between distinct points in this function space can be defined. If now all meaningful words are situated at a distance of two units from each other, any single error will transform the word affected into a meaningless one, so that the single error can be detected.

Further, if all meaningful words are situated at a distance of three units from each other, any single error will transform the word affected into a meaningless one; but in this case the meaningful word transmitted is nearest the meaningless one received, so that single errors can be corrected. This process can be extended to cover detection and correction of more than one error.

It is important to note that, in the case of the single error-detecting code, the mechanism which permits detection of single errors through the addition of a variable nth digit is in practice "fail-safe". If, at the sending end, a 0 is added instead of a 1, there will be an odd number of 1's in the word and the error (though virtual) will be detected at the receiving end. Conversely, if at the receiving end an even number of 1's is counted as an odd number, the improper operation of the counter will also be signaled as an error. For further elucidation on codes for error detection, one is referred to "Error Detecting and Error Correcting Codes," by R. W. Hamming, Bell System Technical Journal, vol. XXIX, April, 1050, p. 147.

The encoding device 12 spaces the error-free information into items of information with gaps between items which are slightly longer than the time required for the item being processed by the information-handling machine to reach the check point. The reason for these gaps will be shown subsequently herein. An encoding device illustrative of the type which may be employed may be found described in a patent to R. W. Hamming et al., No. 2,552,629. It is interesting to note that Hamming performs his encoding with relays. Their electronic equivalents may also be used. Spacing to provide for the gaps may be accomplished by the manner in which the original information is applied from the error free source, or by operating the encoding device 12 so that it does not release an item until a given time has elapsed after the release of the previous item. This may require some storage facility such as a register or a magnetic tape or drum to secure continuous operation.

A tapped delay line 14 for the flow of items of information is provided. The delay between each tap (output terminal) is also made slightly longer than the time required for the information item being processed to reach the check point from the encoding device. This time, however, is slightly shorter than the duration of the gap. The output of the encoding device 12 is applied to one end of the delay line 14. A multitap switch 16 is connected to the tapped delay line. The selecting arm 18 of the switch 16 is at the first tap so that the item of information entering the delay line is also applied to the input of the information-handling machine 20 to be processed. Multitap switch 16 may be a reversible motor driven drum switch or a selecting relay, of the type well known in the telephone and telegraph art, which is capable of being reversibly operated. The processed information passes from the information-handling machine 20, by a check point 22, and through a normally open gate 24 to an external utilization device 26 if the processed information is correct.

An error detecting device 28 samples the processed item of information at the check point 22. The error detecting device 28 may be a system of the type also shown and described in the patent to Hamming et al. previously identified. There may also be used a counter, as previously indicated, which determines whether there are an odd or even number of 1's in the processed item of information. Such a counter may be a binary stage or a two-tube trigger circuit of the Eccles-Jordan type as described in "Theory and Application of Electron Tubes," by Reich, pp. 353–360, published by the McGraw-Hill Book Company. The trigger circuit has two stable states and may be tripped from one to the other by the application of pulses which may represent the "ones" in a code. If one stable state of the trigger circuit is designated as the starting or even state and the other is the odd state, then every time the trigger circuit is left in its odd state after a count there is an error in the code. An output may be taken from the trigger circuit in its odd state of stability and applied through an integrating circuit to the gate 28. The output from the integrating circuit is applied to the tap switch 18 and may also be applied after a delay to reset the counter to its even state in time for the next item count. The integrating circuit is required so that no false output is provided from the trigger circuit while it is in the process of counting.

As a matter of fact, such a system may also be used for encoding, since when an odd count occurs the output pulse derived may be added to the item code. If no error is detected, then the processed item of information passes from the machine as above indicated and the next item of information is permitted to enter the information handling machine.

If the error detecting device 28 finds an error, it closes the gate 24 so that the erroneous information is prevented from reaching the utilization device 26. The tap switch arm 18 is then actuated to the next delay line tap from which the item of information may be again applied to the information-handling machine for processing. If the processing is again faulty, the operation is repeated. The gate 24 will be kept closed and the tap switch will be advanced for as many repetitions of the processing of the item of information as are required, until either the processing is correct and the information is passed to the utilization device or until the end of the tap switch is reached, at which time an alarm 30 is excited which can shut down the machine or provide any desired indication. By way of example, the gate 24 may be a normally closed relay which is opened by the application of a pulse from the error detecting device. It also may be a dual grid gate of the type shown in the book entitled "High Speed Computing Devices" by Engineering Research Associates, page 37, published by the McGraw Hill Book Company. The gate is biased so that it passes signals applied to one grid. Signals applied to the other grid serve to block the tube. This type of gate operation is well known in the art. As many delay steps as there are expected errors in the run to be performed may be provided.

If the item of information which has been reapplied to the information-handling machine is properly processed, and no error is detected, then a gap detecting device 32 detects the presence of the gap between the items of information and operates to move the selecting switch arm 18 back one step, taking care to do this at the precise instant the gap passes the switch, so that the flow of information to the machine is not interrupted. The gap detecting device may simply be a rectifier and filter circuit which is well known in the art. If the filter is given a reasonably short time constant, the voltage output of the filter will fall almost as soon as an item has passed. This drop in voltage output can be readily amplified and applied to operate the multitap switch. If the encoded information is recorded on magnetic tape a number of equidistant spaced pickup heads may be used to provide the required delay intervals.

As many of these error detection and avoidance systems as are desired may be utilized to check the various processes of any complex information-handling machine.

From the foregoing description, it will be readily apparent that a novel and simple error detecting and avoidance system for use with information-handling machines has been shown and described which utilizes reapplication of information and repetition of operations between a known error-free point and a check point in the machine. While only a single embodiment of the present invention has been shown and described, it should be apparent that many changes may be made in the particular embodiment herein disclosed, and that many other embodiments are possible, all within the spirit and scope of the present invention. It is therefore desired that the foregoing description shall be taken as illustrative and not as limiting.

What is claimed is:

1. In combination with an information-handling machine, an error avoidance system comprising an error-free information source, means to apply an item of information from said source to said machine input including time delay means to store said item of information and to receive continuously at regular intervals subsequent items from said source, means to detect an error in said item of information at the output of said machine, means to prevent external delivery of information from said machine responsive to a detection of an error by said error detecting means, means to reapply said item of information from said storage means responsive to said detection of an error by said error detecting means, and means to condition said storage means to apply a subsequent item of information to said machine input responsive to proper handling of said applied item of information by said machine.

2. In combination with an information-handling machine, an error avoidance system comprising an error-free information source, means to encode information from said source for error detection, a tapped delay line having an end connected to said information encoding means, a tap switch having each tap connected to said delay line taps, said tap switch having a selecting arm connected to said information-handling machine, means to detect an error in said error-free source information connected to the output of said information-handling machine, an output gate at the output of said information-handling machine, said gate being closed responsive to the detection of an error by said error-detection means to prevent external delivery of information by said information-handling machine, means to move said tap switch selecting arm to a subsequent tap to reapply error-free information to said information-handling machine responsive to an error detected by said error-detection means, and means to restore said tap switch to its starting position responsive to an error-free handling of said information by said machine.

3. An error avoidance system as recited in claim 2 wherein the interval between said delay line taps is sufficient to store one item of information and said means to restore said tap switch to its starting position is responsive to the interval between an item of information which has been applied to said machine to be processed and a subsequent item of information which is being applied to said machine to be processed.

4. In combination with an information-handling machine, an error avoidance system comprising delay storage means having a first and a second output terminal, said delay storage means providing a predetermined delay to the passage of information from said first output terminal to said second output terminal, means for applying error-free information items to the input of said storage means at predetermined spaced intervals, means for selectively coupling one of said output terminals to the input of said machine, said coupling means including means responsive to an error signal for switching the coupling of said machine input from said first to said second output terminal, and means coupled to said machine output for detecting an error in the output information of said machine and for applying an error signal to said switching means upon the occurrence of an error.

5. In combination with an information-handling machine, an error avoidance system comprising delay storage means having a first and a second output terminal, said delay storage means providing a predetermined delay to the passage of information from said first output terminal to said second output terminal, means for applying error-free information items to the input of said storage means at predetermined spaced intervals, means for selectively coupling one of said output terminals to the input of said machine, said coupling means including means responsive to an error signal for switching the coupling of said machine input from said first to said second output terminal, and means coupled to said machine output for detecting an error in the output information of said machine and for applying an error signal to said switching means upon the occurrence of an error, and means responsive to said error signal for preventing external delivery of said output information.

6. In combination with an information-handling machine having a predetermined operating period, an error avoidance system comprising delay storage means having a first and a second output terminal, said delay storage means providing a predetermined delay greater than said operating period to the passage of information from said first output terminal to said second output terminal, means for continuously applying error-free information items to the input of said storage means at regular intervals greater than said delay, means for selectively coupling one of said output terminals to the input of said machine, said coupling means including means responsive to an error signal for switching the coupling of said machine input from said first to said second output terminal, means coupled to said machine output for detecting an error in the output information of said machine and for applying an error signal to said switching means upon the occurrence of an error, and means responsive to the absence of an item of information at said second output terminal for a predetermined interval greater than said machine operating period for actuating said switch means to restore the coupling of said machine input to said first output terminal.

References Cited in the file of this patent

UNITED STATES PATENTS

| | | |
|---|---|---|
| 1,972,326 | Angel | Sept. 4, 1934 |
| 2,121,163 | Robinson | June 21, 1938 |
| 2,471,126 | Spencer et al. | May 24, 1949 |
| 2,518,405 | Van Duuren | Aug. 8, 1950 |